United States Patent [19]

Hollants

[11] Patent Number: 4,491,410
[45] Date of Patent: Jan. 1, 1985

[54] LIGHTING SYSTEM FOR USE IN A PHOTOGRAPHIC ENLARGER

[75] Inventor: Henricus C. J. Hollants, Eindhoven, Netherlands

[73] Assignee: U.S. Philips Corporation, New York, N.Y.

[21] Appl. No.: 369,788

[22] Filed: Apr. 19, 1982

[30] Foreign Application Priority Data

May 18, 1981 [NL] Netherlands .......................... 8102417

[51] Int. Cl.³ .............................................. G03B 27/54
[52] U.S. Cl. ....................................... 355/67; 355/71; 355/18
[58] Field of Search ........................ 355/67, 71, 18, 69, 355/70; 362/3, 293; 352/198, 203

[56] References Cited

U.S. PATENT DOCUMENTS

| 162,759 | 5/1875 | Marcy | 362/293 |
| 1,784,097 | 12/1930 | Hayden | 352/203 |
| 2,176,625 | 10/1939 | Friedman | 362/293 |
| 2,258,014 | 10/1941 | Kallusch | 362/293 |
| 3,813,569 | 5/1974 | Verstegen et al. | 355/67 |

Primary Examiner—Monroe H. Hayes
Attorney, Agent, or Firm—Robert S. Smith

[57] ABSTRACT

Lighting system of a photographic enlarger having a discharge lamp in the form of a compact fluorescent low-pressure mercury vapor discharge lamp. The house of the lighting system is provided with a window holding a colored plate at the side remote from the enlarger. The lighting system then also functions as a dark room lamp.

1 Claim, 1 Drawing Figure

U.S. Patent    Jan. 1, 1985    4,491,410
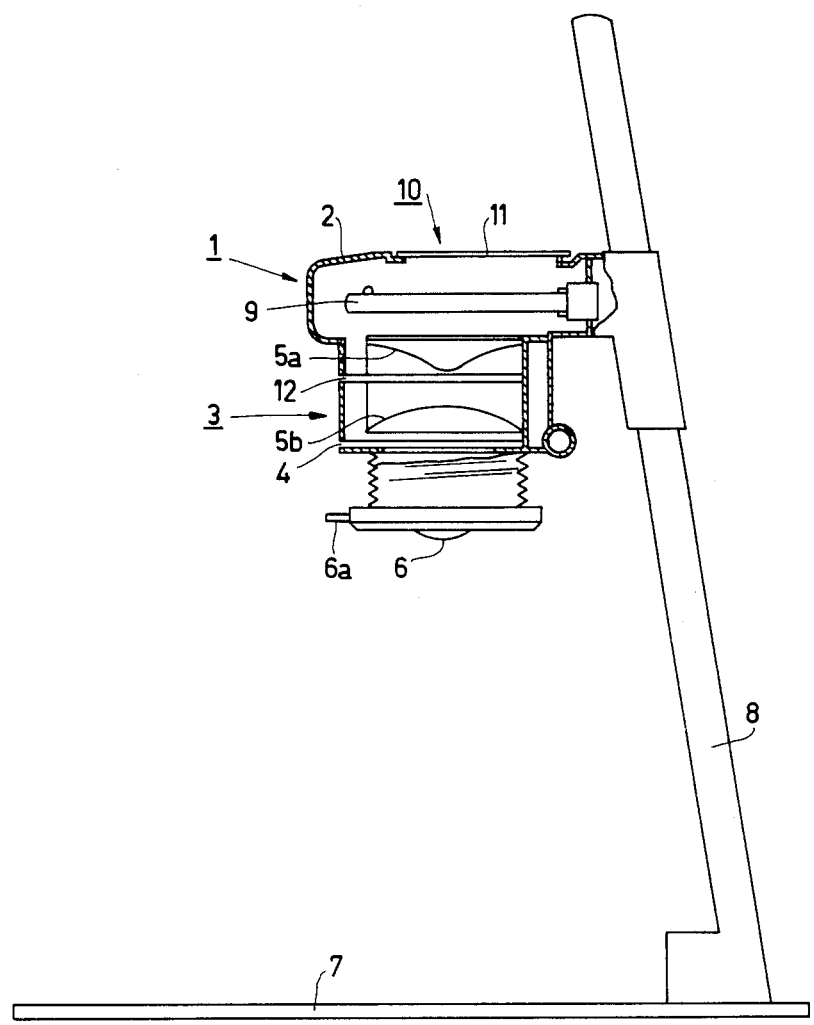

LIGHTING SYSTEM FOR USE IN A PHOTOGRAPHIC ENLARGER

The invention relates to a lighting system for use in a photographic enlarger comprising an optical system for enlarging a transparent illuminated original, the lighting system having a lamp housing incorporating at least a discharge lamp. Light emitted by the lamp emerging from the lamp house at the side which, in use of the lighting system, faces the optical system of the enlarger. Such a lighting system is described in German Patent Specification No. 1,036,039.

Usually, the optical system of the enlarger has one or more condenser lenses or a diffuser plate and an objective lens. An enlargement of a transparent, illuminated original (for example a photographic negative) is produced on a photo-sensitive layer by means of this optical system.

In the lighting system described in the above-mentioned Patent Specification, the discharge lamp has a conical shape and is in the form of a helical tube. Although the use of a discharge lamp, more specifically a low-pressure discharge lamp, in a lighting system of a photographic enlarger, is advantageous, particularly because of the comparatively low operating temperature of said lamps (particularly in comparison with the incandescent lamps frequently employed in said arrangements), the prior art lamp is difficult to fabricate owing to the necessary bending procedure. Furthermore, the lamp is bulky, as a result of which one end of the lamp is situated outside the lamp housing.

It is an object of the invention to provide a lighting system being of such a form that the discharge lamp included therein may simultaneously be used for the illumination of a dark room.

A lighting system according to the invention is characterized in that a window which holds a transparent, colored plate is provided in that portion of the exterior wall of the lamp house which during operation is remote from the optical system of the enlarger.

In a system in accordance with the invention the discharge lamp is uninterruptedly in operation during the printing and enlarging procedure, the (white) light emitted by the lamp is incident on the photo-sensitive material for only an adjustable short period of time (the exposure time). For that purpose the lighting system or the enlarger for example is provided with a shutter, which is only open during the exposure time. In a practical embodiment the lighting system forms one whole with the enlarger, the shutter being provided near the lens. The shutter is, for example, in the form of a mechanically movable plate. Unwanted transient phenomena after ignition of the lamp (such as a change in the intensity of the light emitted by the lamp or a shift of the color point) are obviated in a lighting system in accordance with the invention.

Because of the presence of a window having a transparent colored plate in the house of the lighting system the lighting system is also usable as a "safelight" lamp for illuminating the dark room in which the enlarger is present. The intensity and the color of the light transmitted through the window into the dark room may be determined by the user by a suitable choice of the color and the color density of the plate. These quantities are closely related to the sensitivity of the paper with photosensitive layer onto which the image of a negative is projected by means of the enlarger. In one embodiment the said plate consists of a plastic material which only transmits the yellowish-green component of the white light of the lamp.

The discharge lamp in a system in accordance with the invention is preferably a low-pressure mercury vapor discharge lamp of small dimensions; an example of a suitable lamp is a lamp having a form as described in DE-OS No. 3,011,382. Owing to the comparatively low operating temperature of such lamps, the wall of the housing of the lighting system may be a plastic material. In addition, the dimensions of the lamp house of the lighting system are relatively small.

In a specific embodiment of a lighting system in accordance with the invention the house comprises means for closing the window in a light-tight manner. An example of such a means is a plate which is movable to in front of the window, or a hinged plate on the lamp house.

A lighting system in accordance with the invention may be marketed as a separate component. The lamp house of such a system then is connectable in a detachable manner to existing enlargers, for example by means of a snap connection. Alternatively the lighting system may form one whole with the enlarger.

The invention may be used both in apparatus intended for enlarging and printing black-white negatives, as well as color negatives (for example by means of the subtractive method). For that purpose the enlarger connected to the lamp house comprises, for example, a special holder for color filters.

An embodiment of the invention will now be further described by way of non-limitative example with reference to the accompanying drawing.

This drawing shows schematically (partly in elevational view, partly in a cross-sectional view) an embodiment of a lighting system in accordnace with the invention, which forms one whole with a photographic enlarger.

The lighting system 1 has a thin-walled lamp house 2, of a plastics material, which forms one whole with the wall of a photographic enlarger 3. Said apparatus has a slot 4 in which a negative of a film may be positioned. The enlarger has an optical system comprising a generally conical diffuser lens 5a, a condenser lens 5b and an objective lens 6. An image of the negative is projected through the objective lens onto a baseboard 7, on which a photosensitive plate is present. A column 8 is attached to the baseboard. The height of the enlarger with respect to the baseboard is adjustable on this column 8.

The house 2 includes a compact, white light emitting low-pressure mercury vapor discharge lamp 9 (power 7 W). The lamp may, for example, comprise two tubes which are arranged in parallel with each other and which are interconnected by means of a coupling connection such that the discharge path is U-shaped; see for example DE-OS No. 3,011,382. in which the interior wall of the lamp is provided with a luminescent layer consisting of a mixture of 3 phosphors, namely terbium-activated cerium magnesium aluminate, bivalent europium-activated barium magnesium aluminate and trivalent europium-activated yttrium oxide. White light emitted by the lamp 9 emerges in the direction of diffuser lens 5a through the optical system. A shutter (consisting of a circular black plastics plate) is provided near the objective 6, which shutter can be operated by means of knob 6a. The shutter can be opened by a user (for example by means of a timer) for an adjustable short period of time (the exposure time), light coming from lamp 9 being incident on the baseboard 7. It has been found that a light distribution of a surprisingly high uniformity is obtained on the baseboard. The lamp remains operative for the whole period of time the user uses the enlarger for printing and enlarging negatives. That portion of the exterior wall of lighting system 1 which is located at the top (during operation said wall portion is remote from the optical system of the enlarger) comprises a window 10 in which a diffusing plate 11 of a plastic material (e.g. 3 mm thick) is present. The plate 11 transmits only yellowish-green light. The system 1 thus also has for its function to illuminate the dark room. The sensitive material of the plate on the baseboard 7 is not sensitive to the upwardly-emitted yellowish-green light. It is thus not necessary for the user to use separate safelight lamps especially designated for illuminating dark rooms. In a special embodiment the plate 11 can be closed in a light-tight manner by means of a movable opaque plate (not shown in the drawing), which can be fastened on the lamp house.

The enlarger 3 further comprises a slot 12 in which color filters may be positioned.

What is claimed is:

1. A lighting system for use in a photographic enlarger comprising an optical system for enlarging a transparent illuminated original, the lighting system having a lamp housing incorporating at least a low pressure mercury vapor discharge lamp, light emitted by said lamp emerging from said housing through a side which in the operating condition faces the optical system of said enlarger, characterized in that a window which holds a transparent, colored plate is provided in that portion of the exterior wall of the housing which during enlarger operation is remote from the optical system of the enlarger, said housing being provided with shutter means for controlling light reaching an associated photo sensitive material.

* * * * *